US009824606B2

(12) United States Patent
Basson et al.

(10) Patent No.: US 9,824,606 B2
(45) Date of Patent: Nov. 21, 2017

(54) ADAPTIVE SYSTEM FOR REAL-TIME BEHAVIORAL COACHING AND COMMAND INTERMEDIATION

(75) Inventors: Sara H. Basson, White Plains, NY (US); Genady Grabarnik, Scarsdale, NY (US); Dimitri Kanevsky, Ossining, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 1225 days.

(21) Appl. No.: 12/549,852

(22) Filed: Aug. 28, 2009

(65) Prior Publication Data
US 2011/0053129 A1   Mar. 3, 2011

(51) Int. Cl.
*G09B 19/00* (2006.01)

(52) U.S. Cl.
CPC ................ *G09B 19/00* (2013.01)

(58) Field of Classification Search
CPC . G09B 7/04; G09B 7/02; G09B 19/00; G09B 5/00; G09B 23/28; G06C 30/02; G06F 17/3053; G06F 17/30525; A61B 5/16; B25J 9/1671; G05D 1/0088
USPC ......... 434/238, 236, 350; 700/245, 249, 248
See application file for complete search history.

(56) References Cited

U.S. PATENT DOCUMENTS

| 5,879,163 | A | * | 3/1999 | Brown et al. ................ 434/236 |
| 5,944,530 | A | * | 8/1999 | Ho et al. ...................... 434/236 |
| 6,072,395 | A | * | 6/2000 | Vega ........................... 340/573.1 |
| 6,083,073 | A | | 7/2000 | McFarlane et al. |
| 6,699,043 | B2 | * | 3/2004 | Ho et al. ........................ 434/236 |
| 8,540,516 | B2 | * | 9/2013 | Williams et al. .............. 434/236 |
| 2001/0029319 | A1 | * | 10/2001 | Kazlausky et al. ........... 600/300 |
| 2001/0031451 | A1 | * | 10/2001 | Sander et al. ................. 434/236 |
| 2002/0194032 | A1 | * | 12/2002 | Mankopf et al. .................. 705/3 |
| 2004/0014014 | A1 | * | 1/2004 | Hess ............................. 434/236 |
| 2004/0030571 | A1 | * | 2/2004 | Solomon .............. G05D 1/0088 700/248 |
| 2004/0248070 | A1 | * | 12/2004 | Ancier .......................... 434/238 |

(Continued)

OTHER PUBLICATIONS

Brainmaster Technologies. Inc., "Vision", http://www.brainmaster.com/Vision/vision.html, last visited on Sep. 24, 2015, pp. 1-2.

(Continued)

*Primary Examiner* — Eddy Saint-Vil
(74) *Attorney, Agent, or Firm* — Fleit Gibbons Gutman Bongini Bianco PL; Jose Gutman

(57) ABSTRACT

A method, information processing system, and computer readable article of manufacture reinforce behavior in an individual. A behavior associated with an individual is monitored. A determination is made, based on the monitoring, that the behavior substantially matches a behavior in a set of behaviors. A set of interactive actions associated with the behavior are identified. At least one of the interactive actions in the set of interactive actions is selected. The at least one of the interactive actions that has been selected is performed. A response from the individual is monitored in response to the least one of the interactive actions being performed. An indicator is associated with the at least one of the interactive actions based on the reaction from the individual. The indicator indicates a relative degree of success in obtaining a desired response from the individual.

17 Claims, 4 Drawing Sheets

(56) References Cited

U.S. PATENT DOCUMENTS

| | | |
|---|---|---|
| 2006/0046238 A1* | 3/2006 | DeGregory .............. G09B 7/02 |
| | | 434/350 |
| 2006/0263754 A1 | 11/2006 | Brazil |
| 2006/0294564 A1 | 12/2006 | Guillorit |
| 2007/0020596 A1 | 1/2007 | Thurman |
| 2007/0048705 A1* | 3/2007 | Belter ........................... 434/236 |
| 2007/0054245 A1* | 3/2007 | Greenfield et al. ........... 434/112 |
| 2007/0105080 A1* | 5/2007 | Hersh ........................... 434/236 |
| 2007/0117073 A1 | 5/2007 | Walker et al. |
| 2008/0187893 A1* | 8/2008 | Blaustein et al. ............ 434/236 |
| 2008/0227065 A1 | 9/2008 | Hamway et al. |
| 2009/0055019 A1* | 2/2009 | Stiehl ..................... B25J 9/1671 |
| | | 700/249 |
| 2010/0159438 A1* | 6/2010 | German et al. ............... 434/433 |

OTHER PUBLICATIONS

Wikipedia, "Reinforcement Learning", https://en.wikipedia.org/wiki/Reinforcement_learning, last visited on Sep. 24, 2015, pp. 1-11.

\* cited by examiner

ADAPTIVE SYSTEM FOR REAL-TIME BEHAVIORAL COACHING AND COMMAND INTERMEDIATION

FIELD OF THE INVENTION

The present invention generally relates to behavioral monitoring and response systems, and more particularly relates to an adaptive real-time behavioral monitoring and interaction system.

BACKGROUND OF THE INVENTION

The "emotional center" for humans is the limbic brain, which is a separate entity from the rational and decision-making neo-cortex. Adults generally have a developed pre-frontal cortex that allows them to bring strong emotions such as frustration and anger under control. This can be considered the "inner voice of reason" that enables adults to keep strong emotional impulses in check. However, the neo-cortex in children is still developing, which results in harnessing frustration and emotional outbursts and to generally "do the right thing" being more difficult for a child. Usually an adult parent-figure who is monitoring the child's behavior is able to provide repeated cues and admonitions for behavioral change in these situations. However, there are a number of disadvantages to this situation such as parental figures may not always be present or even when parental figures are present they may not want to be perceived as incessantly "nagging" the child. Also, the repeated barrage from parents might cause the child to simply ignore the parent. Even further, the parent himself/herself may become emotionally involved and upset by the child's behavior and lack of response. This has made teaching certain individuals, such as a child, the correct response or method of handling various emotions more difficult.

SUMMARY OF THE INVENTION

In one embodiment, a method with an interactive electronic device for reinforcing behavior of an individual is disclosed. The method comprises monitoring a behavior of an individual. A determination is made, based on the monitoring, that the behavior substantially matches a behavior in a set of behaviors. A set of interactive actions associated with the behavior are identified in response to the determination. At least one of the interactive actions in the set of interactive actions is selected in response to the identifying. The at least one of the interactive actions that has been selected is performed. A response from the individual is monitored in response to the least one of the interactive actions being performed. An indicator is associated with the at least one of the interactive actions based on the reaction from the individual that has been monitored. The indicator indicates a relative degree of success in obtaining a desired response from the individual.

In another embodiment, an interactive electronic device for reinforcing behavior of a child is disclosed. The interactive electronic device includes a memory and a processor that is communicatively coupled to the memory. An adaptive interactive system is communicatively coupled to the memory and the processor. The adaptive interactive system monitors a behavior of a child. A determination is made, based on the monitoring, that the behavior substantially matches a behavior in a set of behaviors. A set of interactive actions associated with the behavior are identified in response to the determination. At least one of the interactive actions in the set of interactive actions is selected in response to the identifying. The at least one of the interactive actions that has been selected is performed. A response from the child is monitored in response to the least one of the interactive actions being performed. An indicator is associated with the at least one of the interactive actions based on the reaction from the child that has been monitored. The indicator indicates a relative degree of success in obtaining a desired response from the child.

In yet another embodiment, a computer readable article of manufacture tangibly embodying computer readable instructions which when executed causes a computer to carry out the steps of a method is disclosed. The method comprises monitoring a behavior of a child. A determination is made, based on the monitoring, that the behavior substantially matches a behavior in a set of behaviors. A set of interactive actions associated with the behavior are identified in response to the determination. At least one of the interactive actions in the set of interactive actions is selected in response to the identifying. The at least one of the interactive actions that has been selected is performed. A response from the child is monitored in response to the least one of the interactive actions being performed. An indicator is associated with the at least one of the interactive actions based on the reaction from the child that has been monitored. The indicator indicates a relative degree of success in obtaining a desired response from the child.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The term plurality, as used herein, is defined as two or more than two. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
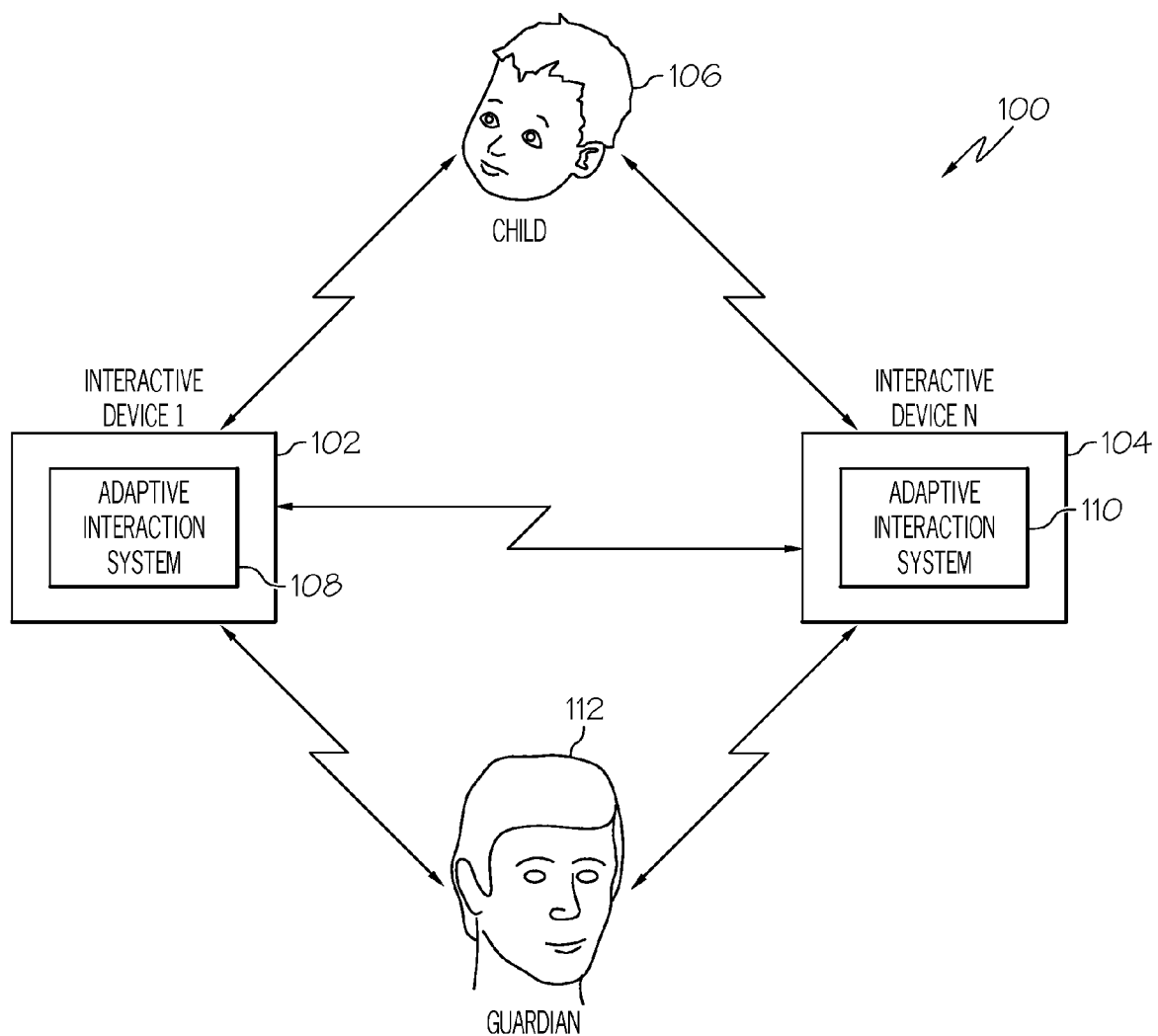
FIG. 1 is a block diagram illustrating one example of an operating environment according to one embodiment of the present invention.

According to one embodiment of the present invention, as shown in FIG. 1, an operating environment 100 includes one or more interactive devices 102, 104 that interact with one or more children 106. The interactive devices 102, 104, via an adaptive interaction system 108, 110 (which is discussed in more detail with respect to FIG. 2), monitor a child's behavior and actions with respect to an environmental context. The interactive devices 102, 104 then provide real-time coaching and feedback to the child. The interactive devices 102, 104 are also adaptive in that they learn from a child's response (or lack or response) to the feedback given to the child so that the same or different feedback can be given to the child in the future.

In one embodiment, the an interactive device 102, 104 is an item that can be coupled to a child 106 or an item of clothing on the child 106 such as a watch, a bracelet, or the like. Also, the interactive device 102 can communicate with another interactive device 102 104 to provide a more interesting and enjoyable experience for the child 106. In another embodiment, a guardian 111 of the child such as a parent can interact with the interactive device 102, 104, such as via a user interface, to program various responses to a child's behavior, various behaviors to identify, and the like.

Interactive Electronic Device

Figure 2:
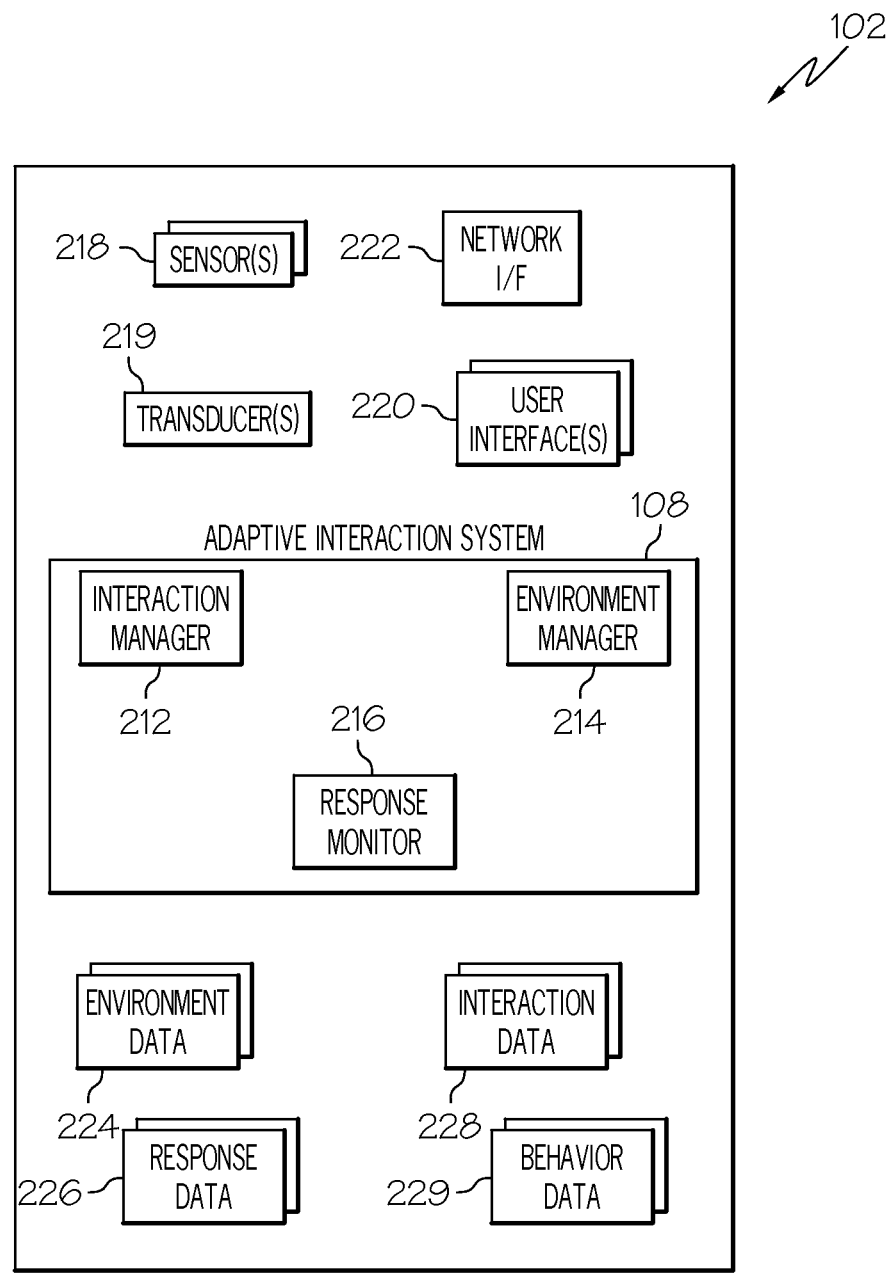
FIG. 2 is a detailed view of an interactive electronic device according to one embodiment of the present invention.

FIG. 2 shows a more detailed view of the interactive electronic device 102. In particular, the interactive device 102 includes an adaptive interaction system 108. The adaptive interaction system 108 comprises a processor and memory communicatively coupled thereto. An interaction manager 212, an environment manager 214, and a response monitor 216 are communicatively coupled with the processor. The interactive device 102 also includes one or more sensors 218, one or more transducers 219, one or more user interfaces 220, and an optional network interface(s) 222 communicatively coupled to the processor. An environment data store 224, a response data store 226, an interaction data store 228, and a behavior data store 229 are contained in the memory.

The one or more sensors 218 can include cameras, microphones, clocks, motion sensors, heat sensors, thermometers, infrared sensors, light sensors, one or more transducers 219, and the like. For example, a motion of an arm of an interactive device 102 can be controlled by the processor. Also, the eyes of an interactive device 102 can move, wink, cry tears; the face can frown or smile; the mouth can move to simulate talking; the head can shake to indicate "yes" or "no"; the shoulders can shrug to indicate "I don't know"; the legs can move; and the like. The one or more user interfaces 220 can include a display, a speaker, a keyboard, a tactile interface, or any other interface that allows the interactive device 102 to interact with a human being and/or allow a human being to interact with the interactive device 102.

The network interface(s) 222 allows the interactive device 102 to connect to and communicate over one or more wired or wireless networks. The network interface(s) 222 also allows the interactive device 102 to connect to and communicate with one or more other interactive devices 104. It should be noted that the interactive device 102 can also communicate with other interactive devices 104 via the sensors 218 and/or user interfaces 220 as well. Even further, the allows the interactive device 102 to connect to and communicate with one or more remote information processing systems. These remote information processing systems can remotely perform the managing and monitoring functions of various embodiments to process the operational sequence discussed below with respect to FIG. 3.

The environment data 224, in one embodiment, is data associated with environmental situations/factors detected by the environment manager 214 and/or given environmental situations that the environment manager 214 is to detect. Since the interaction system 108 is an adaptive system, the interactive device records environmental data when it is interactive with a child 106 in order to learn from prior interactions. For example, the environment manager 214 can monitor sights and sounds such as whether the child 106 is screaming and having a tantrum, whether there are toys on the floor, whether it is bedtime for the child and the child is still awake, and the like. This monitored information is recorded and stored in the memory as environment data 224. Also, environment data 224 such as a specific bedtime can be stored in the interactive device 102 by the child's guardian 111. In this embodiment, when the interactive device 102 is monitoring or interacting with a child 106 the interactive device 102 is able to determine by this stored environment data 224 that it is the child's bedtime.

The interaction data 228, in one embodiment, comprises various interaction operations or actions that the interactive device is to perform in response to a child's behavior detected by the interaction manager 212. For example, the interaction data 228 can indicate that if the interaction manager 212 determines that a child is throwing a tantrum that the interactive device 102 is to play a sound file that instructs the child 106 to count to ten to help the child relax. It should be noted that the interaction data 228 can include multiple interaction operations for accomplishing the same task. For example, to help a child who plays rough with other children the interaction data 228 can include multiple interaction operations that can be performed by the interactive device 102 for helping the child play less rough with other children. For example, one interaction operation can include an audible warning telling the child "to play nice" in a strict tone of voice, whereas another interaction operation can include an audible warning that asks the child "would you like someone to do that to you" in a softer tone of voice along with a visual cue as well. Another example is different types of music to indicate a positive action was performed by the child or a negative action was performed by the child. This prevents the interactive actions for a given behavior from becoming monotonous to the child 106.

When the interaction manager 212 performs an interaction operation, such as by controlling the transducer(s) 219 or the like, the interaction manager 212 monitors the child's response or lack thereof via the behavior response monitor 216. The child's response or lack thereof is then stored as response information 226. The adaptive interaction system 108 uses this response information 226 and optionally the environment data 228 to dynamically adapt (without any user intervention) its selection of interaction operations the next time a substantially similar situation occurs. The adaptive interaction system 108 can also dynamically change one or more specific interaction operations to include or not include one or more features, operations, etc. based on this learning. The adaptive element of the adaptive interaction system 108 is discussed in greater detail below. The interaction operations/actions can be pre-programmed and/or specifically selected/programmed by the parent 111.

It should be noted that the interaction data 228 can also be linked to the environment data 224. For example, the interaction data 228 can include interactive actions that are to be performed when a child 106 is determined by the interaction manager 212 as becoming increasingly frustrated because it is her/his bedtime. However, one interactive action is to be performed when the time of day is in the afternoon while another interactive action is to be performed when it is night time. Therefore, the interaction manager 212 analyzes the environment data 224 to determine the current time and to qualify the interaction to select.

The behavior data 229, in one embodiment, includes a plurality of behaviors that the adaptive interaction system 108 is to monitor from a child 106. For example, these behaviors can include laughing, crying, tantrum throwing, rough playing, bad language use, and the like. These behaviors can be pre-programmed at manufacturing time. In another embodiment, the behavior data 229 also includes specific behaviors that a parent 111 wants the interactive device 102 to monitor for or help coach. For example, the parent 111 can program the interactive device 102 to monitor for a child using "bad" language. Therefore, the interactive device 102 monitors for the behavior of using bad language and performs one or more interaction operations associated with this behavior.

Adaptive Real-Time Behavior Coaching

The following is a more detailed discussion on the adaptive interaction system 108 and its components. In one embodiment, the interactive device 102 is a toy such as a stuffed animal that a child plays with. However, as discussed above, the interactive device can also be a wearable item as well. The interactive device 102 uses its sensors 218 to monitor the child 106 and his/her behavior. The adaptive interaction system 108 receives the input from the sensors 218 and detects whether the child 106 is exhibiting a behavior that requires interaction. For example, the interaction manager 212 can use pattern recognition or any other type of behavior recognition mechanism to determine the child's current behavior. A few non-limiting examples of mechanisms that the interaction manager 212 can use to detect various behaviors of the child are: a combination of voice recognition and image recognition in order to determine an emotional state of a child (e.g., high-pitch scream and crying can be recognized by a combination of a voice and image recognition system); a speech recognition subsystem that detects if the child starts using negative words when he/she is upset, etc.; and pattern recognition methods applied to various other measurements (besides visual and acoustic), such as for example, EEG (electroencephalogram) signals measured by devices such as "EEG cap" which can be disguised as a regular cap, or a game-related cap that the child can wear. These EEG measurements of brain activity can be added as an input to the behavior recognition system.

The adaptive interaction system 108 also utilizes the environment manager 214 to determine the current state of the child's environment such as time of day; the toy the child is playing with; if the child 106 is playing with other children; the scenario location of the child such as in a multi-room building, a playground, or an outdoor scenario; and the like. The adaptive interaction system 108 analyzes the behavior data 229 to determine if a monitored for behavior has been detected. For example, the interactive device 102 can be programmed to determine when a child is becoming tired. This behavior can be pre-programmed into the device at manufacturing time or can be programmed or configured into the device by the parent/guardian 111.

If the adaptive interaction system 108 detects a behavior that substantially matches a behavior in the behavior data 229 the adaptive interaction system 108 initiates an interaction process to interact with the child 106. In one embodiment, the interaction manager 212 analyzes the corresponding behavior in the behavior data 229 to determine if there is environmental data 224 associated with the behavior. For example, if the behavior is "child getting tired" this behavior can have environmental data such as "morning", "afternoon", or "evening" associated with it. The behavior data 229 can include a flag indicating that the interaction manager 212 is to analyze the environmental data 224. Alternatively, the behavior data 229 can specifically indicate what type of environmental data 224 is to be retrieved for this given behavior. In an even further embodiment, the interactive action in the interaction data 228 associated with this behavior indicates the type of environmental data (if any) that is to be retrieved. In the current example, the behavior "child getting tired" does require environmental information such as the period of day (e.g., morning, afternoon, or night).

The interaction manager 212 retrieves the environmental data 224 that was stored by the environment manager 214 when the current behavior was detected and determines that it is night time. Therefore, for example, the interaction manager 212 analyzes the interactive data 228 to identify the interactive action(s) to be performed by the interactive device 102 for the behavior "child getting tired" when it is night time. As discussed above, a single behavior can have multiple actions associated with it. In other words, the interactive device 102 can select from a plurality of interactive actions to perform with the child 106. Initially, when the actions have not been evaluated by the learning process of the system 108 the interaction manager 212 can randomly select one or more of the interactive actions to perform. Alternatively, the manufacture or parent/guardian 111 can prioritize, assign values, or select which actions the interaction manager 212 are to select first, second, etc. The interaction manager 212 can then adapt and re-optimize its selections based on responses of the child to these interactive actions.

Once an interactive action(s) such as playing an audio file that tells the child it is time to go to bed or telling the child that the device is tired as well and would like to go to bed, is selected the interactive device 102 performs the action. The response monitor 216 monitors the child's response to the performed action and records this respons(es) in the response data 226. For example, the response monitor 216 can record that the child acted positively, negatively, or neutrally (no response at all) to the performed action. The response monitor 216 can also record specific responses as well. For example, the response monitor 216 can record that the child went to sleep, stopped crying, started laughing, ignored the action, became angry, started crying, and the like.

The adaptive interaction system 108 uses this response data 226 to "learn" which actions to perform for a particular child 106. For example, as the adaptive interaction system 108 collects response information 226, the adaptive interaction system 108 can optimize its interactive action selections based on which actions resulted in the most positive responses from the child 106. In other words, the adaptive interaction system 108 learns which actions work the best for a given child and adapts itself to select these best performing actions. In one embodiment, the adaptive interaction system 108 assigns one or more values to each interactive action based on the child's response monitored for that action. In one embodiment, a positive response or a response that substantially matches a desired result (e.g., child went to sleep) associated with an interactive action is assigned a higher value as compared to a negative response or a response that does not substantially match a desired result. These values are used by the adaptive interaction system 108 to determine which interactive actions are the best actions (e.g., actions with the highest values) to select for the child 106. It should be noted that assigning values to responses is only one way to determine which actions are the most successful or most productive with respect to a given child 106 and the various embodiments are not limited to this embodiment. Additionally, in one embodiment, a sequence of interactions and monitored responses can lead to a desired response.

It should be noted that multiple interactive devices 102, 104 can interact together to perform one or more interactive actions when a behavior is detected. In this embodiment, when one or more of the devices 102, 104 detect a behavior being monitored for this device 102, 104 it can notify the other device(s) that the behavior has been detected. If one of these devices 102, 104 has been selected as the "main" device then this "main" device can select the appropriate action(s) to be performed by the devices 102, 104. Otherwise, any of the devices 102, 104 can select action(s) to be performed. One or more of these devices 102, 104 can report positive responses from the child while other devices 102, 104 can report negative responses. In another embodiment, the devices 102, 104 can interact between each other to illustrate and explain to the child the implications of the child's behavior. The devices 102, 104 are able to collectively adapt their own group behavior and select different interactive actions to perform as a group of devices based on the child's response(s) monitored during the interaction. The interactive actions can be performed as a group with the child and/or can be performed with only the devices to demonstrate a particular behavior lesson for the child to learn the behavior.

As can be seen, the various embodiments of the present invention provide an interactive device that can monitor a child's behaviors and actions. These monitored behaviors and actions are processed in an environmental context to provide the child with real-time coaching and feedback to the child. The interactive device is adaptive in that it learns which actions provided the best response from the child and then optimizes its action selection process based on this knowledge.

Operational Flow Diagram

Figure 3:
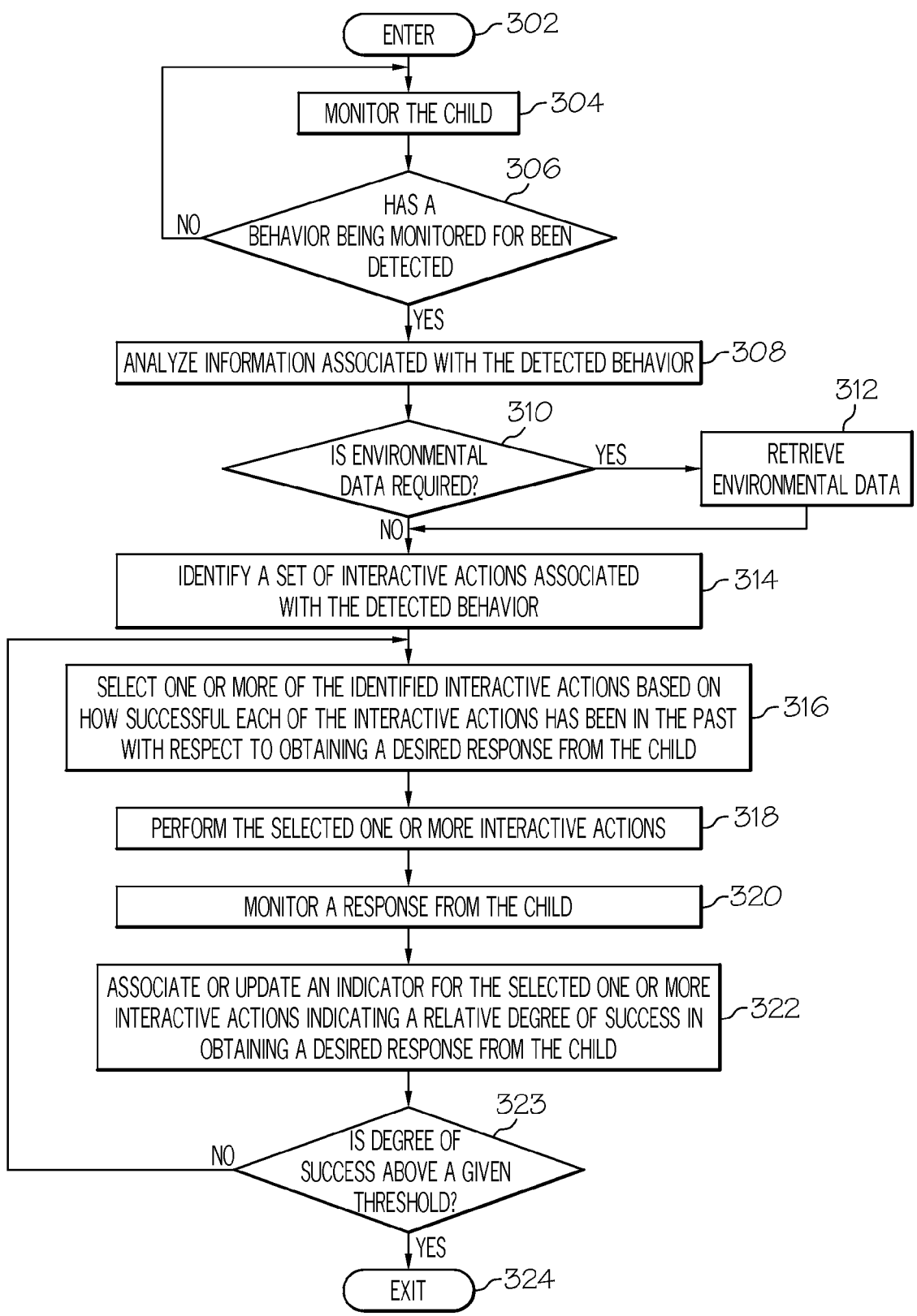
FIG. 3 is an operational flow diagram illustrating one example of a process for reinforcing behavior in a child using an interactive electronic device according to one embodiment of the present invention.

FIG. 3 is an operational flow diagram illustrating one process for reinforcing behavior in a child using an interactive electronic device. The operational flow diagram of FIG. 3 beings at step 302 and flows directly to step 304. The interaction manager 212, at step 304, monitors the child 106 using one or more of the sensors 218. The interaction manager 212, at step 306, determines if a monitored for behavior 229 has been detected. If the result of this determination is negative, the control flow returns to step 304. If the result of this determination is positive, the interaction manager 212, at step 308, analyzes information associated with the detected behavior 229 to determine if environmental data 224 is required for the behavior and to identify a set of interactive actions 228 associated with the behavior 229.

The interaction manager 212, at step 310, determines if environmental data 228 is required for the behavior 229 to identify the set of set of interactive actions 228 associated with the behavior 229. If the result of this determination is positive, the interaction manager 212, at step 312, obtains environmental data 224. If the result of this determination is negative, the interaction manager 212, at step 314, identifies the set of interactive actions 228 associated with the behavior 229. A subset of these interactive actions 228 can further be identified based on the environmental data 228. For example, a subset of the interactive actions 229 associated with a "night time" environment can be identified based on the environmental data 228 indicating that it is night time.

The interaction manager 212, at step 316, selects one or more of the interactive actions 229 that have been identified based on how successful each of the interactive actions 229 has been in the past with respect to obtaining a desired response from the child. The interaction manager 212, at step 318, performs the selected one or more interactive actions. The interaction manager 212, at step 320, monitors a response from the child 106, in response to performing the selected one or more interactive actions 229. The interaction manager 212, at step 322, associates, based on monitoring the response from the child 106, an indicator with or updates the indicator of the one or more interactive actions 229 to indicate a relative degree of success in obtaining a desired response from the child 106. At step 323, the interaction manager 212 determines if the level of success obtained is above a defined threshold indicating a desired response has been sufficiently elicited from the child. If the level of success fails to be above the threshold the control flow returns to step 316. If the level of success is above the threshold the control flow then exits as step 324.

Information Processing System

Figure 4:
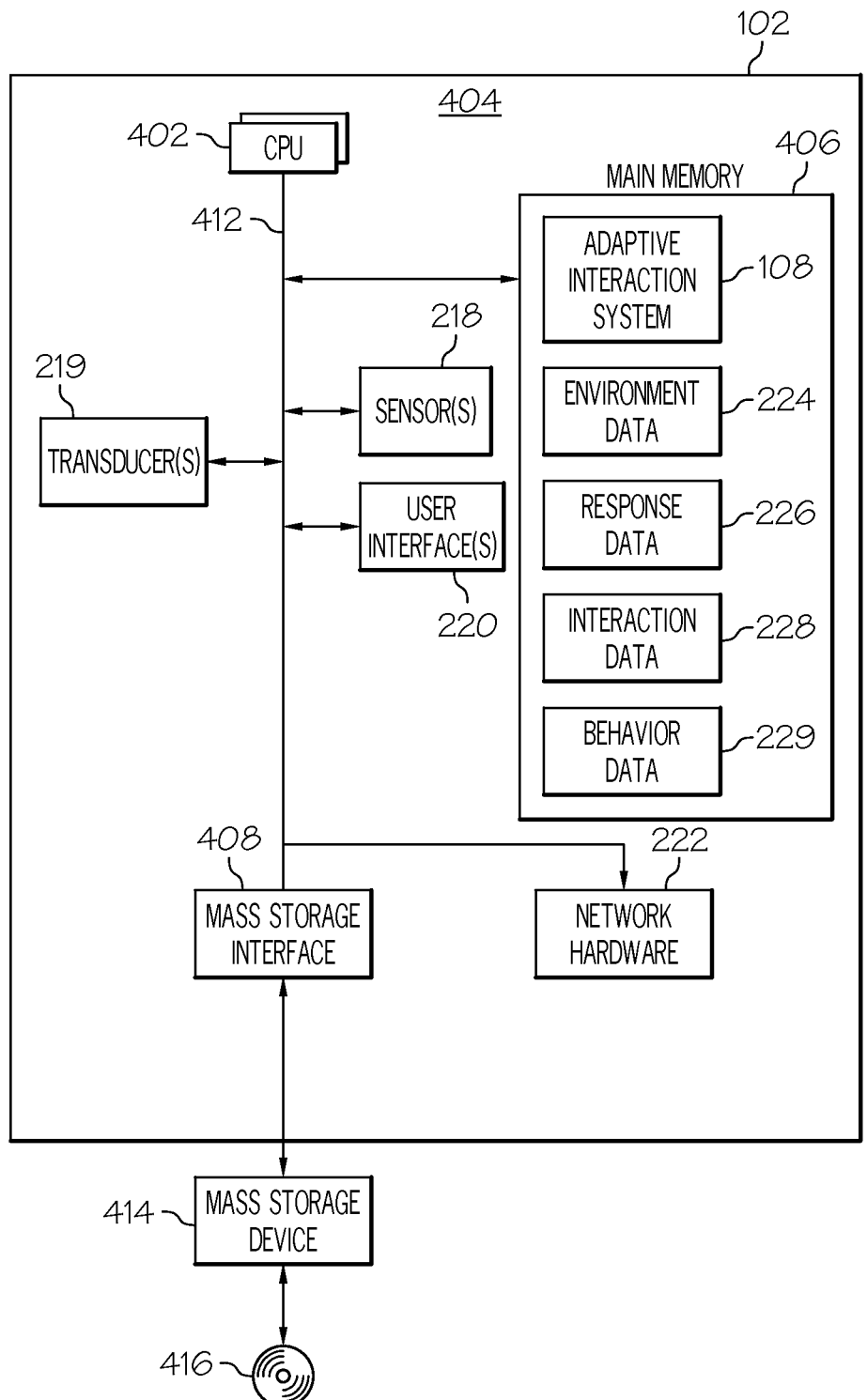
FIG. 4 is a block diagram illustrating a detailed view of an information processing system according to one embodiment of the present invention.

FIG. 4 is a block diagram illustrating a more detailed view of the interactive electronic device 102 according to one embodiment of the present invention. In one embodiment, the interactive electronic device 102 is an information processing system that is based upon a suitably configured processing system adapted to implement the exemplary embodiment of the present invention. It should be noted that throughout the discussion of FIG. 4 the interactive electronic device 102 is referred to as "information processing system 102". Any suitably configured processing system is similarly able to be used as the information processing system 102 by embodiments of the present invention.

The information processing system 102 includes a computer 402. The computer 402 has a processor(s) 404 that is connected to a main memory 406, mass storage interface 408, network adapter hardware 222, sensors 218, transducer(s) 219, and user interfaces 220. A system bus 412 interconnects these system components. The mass storage interface 408 is used to connect mass storage devices, such as data storage device 414, to the information processing system 102. One specific type of data storage device is an optical drive such as a CD/DVD drive, which may be used to store data to and read data from a computer readable medium or storage product such as (but not limited to) a CD/DVD 416. Another type of data storage device is a data storage device configured to support, for example, NTFS type file system operations.

The main memory 406, in one embodiment, comprises the adaptive interaction system 108 and its components 212, 214, 216 discussed above. The main memory 406 can also include the environment data 224, response data 226, interaction data 228, and the behavior data 229. Although illustrated as concurrently resident in the main memory 406, it is clear that respective components of the main memory 406 are not required to be completely resident in the main memory 406 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 406 and data storage device 416. Note that the term "computer system memory" is used herein to generically refer to the entire virtual memory of the information processing system 102. The network may interconnect a remotely located information processing system with one or more interactive devices 102, 104. The information processing system uses the network to communicate and control one or more transducers 219, monitor sensors 218, and user interfaces 22—in the interactive devices 102, 104.

Although only one CPU 404 is illustrated for computer 402, computer systems with multiple CPUs can be used equally effectively. Various embodiments of the present invention further incorporate interfaces that each includes separate, fully programmed microprocessors that are used to off-load processing from the CPU 404. An operating system (not shown) included in the main memory is a suitable multitasking operating system such as the Linux, UNIX, Windows XP, and Windows Server 2003 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 102. The network adapter hardware 222 is used to provide an interface to one or more networks. Various embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 416, CD ROM, or other form of recordable media, or via any type of electronic transmission mechanism.

Non-Limiting Examples

The present invention can be realized in hardware, software, or a combination of hardware and software. A system according to one embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement various embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method with an interactive electronic device for reinforcing behavior of a child, the computer implemented method comprising:

associating a first interactive electronic device in a group of interactive electronic devices with at least a second interactive electronic device in the group of interactive electronic devices, when none of the first interactive electronic device and the at least a second interactive electronic device is selected to be the only interactive electronic device to select appropriate action to be collectively performed by the group of interactive electronic devices, any of the first interactive electronic device and the at least a second interactive electronic device can select appropriate action to be collectively performed by the group of interactive electronic devices; and in response to the first interactive electronic device being the first in the group to perform all of the following:
capturing, by at least one of a visual sensor and an audio sensor of the first interactive electronic device, a behavior of a child, the behavior being an external physical behavior of a given type and a given action;
determining, based on the capturing, that the behavior substantially matches a behavior in a set of behaviors, wherein the behavior in the set of behaviors comprises a given type and a given action matching the given type and given action of the external physical behavior;
identifying, in response to the determining, a set of interactive actions associated with the behavior;
selecting, in response to the identifying, at least one of the interactive actions in the set of interactive actions, wherein the selecting comprises
identifying a value indicating a relative degree of success in obtaining a desired response from the child associated with each of the interactive actions in the set of interactive actions; and
selecting the at least one of the interactive actions in response to the at least one of the interactive actions having a highest value;
then the first interactive electronic device performing the at least one of the interactive actions that has been selected, the performing comprising notifying the at least the second interactive electronic device of the captured behavior and instructing the at least the second interactive electronic device to perform at least one interactive action with the first interactive electronic device collectively adapting their own group behavior based on the response from the child monitored by any of the interactive electronic devices in the group during the at least one interactive action as a group, wherein the at least one interactive action performed as a group between the first interactive electronic device and the at least the second interactive electronic device physically by mechanical movement demonstrates a particular behavior lesson for the child to learn a desired behavior to be performed by the child,
  where the first interactive electronic device and the at least the second interactive electronic device interact with one another by performing a mechanical movement of the first interactive electronic device and the at least the second interactive electronic device, the mechanical movement providing visual action, audible action, or both, as feedback to the child;
monitoring a response from the child in response to the at least one of the interactive actions being performed;
associating an indicator with the at least one of the interactive actions based on the response from the child that has been monitored, wherein the indicator is associated with the at least one of the interactive actions separate from the response from the child, and wherein the indicator indicates a relative degree of success in obtaining a desired response from the child with the at least one of the interactive actions that was performed; and
dynamically adjusting, based on the indicator assigned to the at least one of the interactive actions, a subsequent selection of at least one interactive action in the set of interactive actions for a subsequent detection of the behavior.

2. The computer implemented method of claim 1, further comprising:
receiving, from a guardian of the child, a behavior to be monitored for; and
storing the behavior that has been received in the set of behaviors.

3. The computer implemented method of claim 1, wherein the selecting further comprises:
determining a current environmental context; and
selecting the at least one of the interactive actions based on the current environmental context that has been determined.

4. The computer implemented method of claim 1, wherein the selecting is based on at least one previous monitored response from the child made with respect to one or more of the set of interactive actions.

5. The computer implemented method of claim 1, wherein the at least one of the interactive actions comprises at least one of:
an audible action;
a visual action; and
a physical action.

6. The computer implemented method of claim 1, wherein monitoring the behavior further comprises at least one of:
receiving audio information associated with the behavior;
receiving visual information associated with the behavior; and
receiving tactile information associated with the behavior.

7. The computer implemented method of claim 1, wherein the dynamically adjusting further comprises:

determining if the relative degree of success associated with the indicator is above a given threshold; and
dynamically selecting, in response to the relative degree of success being below the given threshold, at least one other interactive action in the set of interactive actions for the subsequent selection.

8. The computer implemented method of claim 1, wherein the selecting further comprises:
selecting the at least one of the interactive actions by a plurality of interactive devices, wherein the performing further comprises performing the at least one of the interactive action by the plurality of interactive devices.

9. An interactive electronic device for reinforcing behavior of a child, the interactive electronic device comprising:
a memory;
a processor communicatively coupled to the memory; and
an adaptive interaction system communicatively coupled to the memory and the processor, wherein the adaptive interaction system:
  associates the interactive electronic device in a plurality of interactive electronic devices with at least a second interactive electronic device in the plurality of interactive electronic devices which constitutes a group of interactive electronic devices, when none of the interactive electronic device and the at least a second interactive electronic device is selected to be the only interactive electronic device to select appropriate action to be collectively performed by the group of interactive electronic devices, any of the interactive electronic device and the at least a second interactive electronic device can select appropriate action to be collectively performed by the group of interactive electronic devices; and
  in response to the interactive electronic device being the first in the group to perform all of the following:
    captures, by at least one of a visual sensor and an audio sensor of the interactive electronic device, a behavior of a child, the behavior being an external physical behavior of a given type and a given action;
    determines, based on the capturing, that the behavior substantially matches a behavior in a set of behaviors, wherein the behavior in the set of behaviors comprises a given type and a given action matching the given type and given action of the external behavior;
    determines if the behavior is associated with an environmental context flag, wherein the environmental context flag instructs the adaptive interaction system to capture environmental information for the behavior and identifies specific environmental information that is to be captured;
    determines, in response to the behavior being associated with the environmental context flag, a current environmental context associated with the behavior, the current environmental context being specific to the behavior, where different types of environmental contexts are determined for different behaviors;
    identifies, in response to the determining, a set of interactive actions associated with the behavior, wherein two or more behaviors in the set of behaviors are each associated with a different set of interactions, and wherein one or more of the set of interactions is associated with at least one environmental context;

selects, in response to the identifying, at least one of the interactive actions in the set of interactive actions based on the at least one environmental context associated with the at least one of the interactive action matching the current environmental context, wherein the adaptive interaction system selects the at least one of the interactive actions based on identifying a value indicating a relative degree of success in obtaining a desired response from the child associated with each of the interactive actions in the set of interactive actions; and selecting the at least one of the interactive actions in response to the at least one of the interactive actions having a highest value;

then the interactive electronic device performs the at least one of the interactive actions that has been selected, the performing comprising notifying the at least the second interactive electronic device of the captured behavior and instructing the at least the second interactive electronic device to perform at least one interactive action with the interactive electronic device collectively adapting their own group behavior based on the response from the child monitored by any of the interactive electronic devices in the group during the at least one interactive action as a group, wherein the at least one interactive action performed as a group between the interactive electronic device and the at least the second interactive electronic device physically by mechanical movement demonstrates a particular behavior lesson for the child to learn a desired behavior to be performed by the child, and wherein the at least one interactive action performed as a group comprises mechanical movement performed by the interactive electronic device and mechanical movement performed by the at least the second interactive electronic device, where the interactive electronic device and the at least the second interactive electronic device interact with one another by performing a mechanical movement of the interactive electronic device and the other interactive electronic device, the mechanical movement providing visual action, audible action, or both, as feedback to the child, monitors a response from the child in response to the at least one of the interactive actions being performed; and associates an indicator with the at least one of the interactive actions based on the response from the child that has been monitored, wherein the indicator is associated with the at least one of the interactive actions separate from the response of the child, and wherein the indicator indicates a relative degree of success in obtaining a desired response from the child.

10. The interactive electronic device of claim 9, wherein the adaptive interaction system:

receives, from a guardian of the child, a behavior to be monitored for; and stores the behavior that has been received in the set of behaviors.

11. The interactive electronic device of claim 9, wherein the adaptive interaction system further selects at least one of the interactive actions in the set of interactive actions based on:

determining a current environmental context; and selecting the at least one of the interactive actions based on the current environmental context that has been determined.

12. The interactive electronic device of claim 9, wherein the adaptive interaction system selects at least one of the interactive actions in the set of interactive actions based on at least one previous monitored response from the child made with respect to one or more of the set of interactive actions.

13. A system for reinforcing behavior of a child, the system-comprising:

a plurality of interactive electronic devices communicatively coupled to each other, each of the plurality of interactive electronic devices comprising a memory, a processor communicatively coupled to the memory, and an adaptive interaction system communicatively coupled to the memory and the processor, wherein the adaptive interaction system of at least a first interactive electronic device in the plurality of interact electronic devices:

associates the first interactive electronic device in the plurality of interactive electronic devices with at least a second interactive electronic device in the plurality of interactive electronic devices which constitutes a group of interactive electronic devices, when none of the first interactive electronic device and the at least a second interactive electronic device is selected to be the only interactive electronic device to select appropriate action to be collectively performed by the group of interactive electronic devices, any of the first interactive electronic device and the at least a second interactive electronic device can select appropriate action to be collectively performed by the group of interactive electronic devices; and in response to the first interactive electronic device being the first in the group to perform all of the following:

captures, by at least one of a visual sensor and an audio sensor of the first interactive electronic device, a behavior of a child, the behavior being an external physical behavior of a given type and a given action;

determines, based on the capturing, that the behavior substantially matches a behavior in a set of behaviors, wherein the behavior in the set of behaviors comprises a given type and a given action matching the given type and given action of the external physical behavior;

determines if the behavior is associated with an environmental context flag, wherein the environmental context flag instructs the adaptive interaction system to capture environmental information for the behavior and identifies specific environmental information that is to be captured;

determines, in response to the behavior being associated with the environmental context flag, a current environmental context associated with the behavior the current the environmental context being specific to the behavior, where different types of environmental contexts are determined for different behaviors;

identifies, in response to the determining, a set of interactive actions associated with the behavior, wherein one or more of the set of interactions is associated with at least one environmental context;

selects, in response to the identifying, at least one of the interactive actions in the set of interactive actions based on the at least one environmental context associated with the at least one of the interactive action matching the current environmental context, wherein the selecting further comprises:
   identifies a value indicating a relative degree of success in obtaining a desired response from the child associated with each of the interactive actions in the set of interactive actions; and
   selects the at least one of the interactive actions in response to the at least one of the interactive actions having a highest value;
then the first interactive electronic device performs the at least one of the interactive actions that has been selected, the performing comprising notifying the at least the second interactive electronic device of the captured behavior and instructing the at least the second interactive electronic device to perform at least one interactive action with the first interactive electronic device collectively adapting their own group behavior based on the response from the child monitored by any of the interactive electronic devices in the group during the at least one interactive action as a group, wherein the at least one interactive action performed as a group between the first interactive electronic device and the at least the second interactive electronic device physically by mechanical movement demonstrates a particular behavior lesson for the child to learn a desired behavior to be performed by the child, and wherein the at least one interactive action performed as a group comprises mechanical movement performed by the first interactive electronic device and mechanical movement performed by the at least the second interactive electronic device,
   where the first interactive electronic device and the at least the second interactive electronic device interact with one another by performing a mechanical movement of the first interactive electronic device and the at least the second interactive electronic device, the mechanical movement providing visual action, audible action, or both, as feedback to the child;
monitors a response from the child in response to the at least one of the interactive actions being performed; and
associates an indicator with the at least one of the interactive actions based on the response from the child that has been monitored, wherein the indicator is associated with the at least one of the interactive actions separate from the response from the child, and wherein the indicator indicates a relative degree of success in obtaining a desired response from the child.

14. The system of manufacture of claim 13, further comprising instructions for:
   receiving, from a guardian of the child, a behavior to be monitored for; and
   storing the behavior that has been received in the set of behaviors.

15. The system e of claim 13, wherein the instructions for selecting further comprise instructions for:
   determining a current environmental context; and
   selecting the at least one of the interactive actions based on the current environmental context that has been determined.

16. The system of claim 13, wherein the selecting is based on at least one previous monitored response from the child made with respect to one or more of the set of interactive actions.

17. The system of claim 13, wherein the dynamically adjusting further comprises:
   determining if the relative degree of success is above a given threshold;
   dynamically selecting, in response to the relative degree of success being below the given threshold, at least one other interactive action in the set of interactive actions for the subsequent selection.

* * * * *